(12) United States Patent
Volkenandt et al.

(10) Patent No.: US 6,515,739 B2
(45) Date of Patent: Feb. 4, 2003

(54) APPARATUS AND PROCESS FOR SPATIALLY RESOLVED REFRACTIVE POWER DETERMINATION

(75) Inventors: Harald Volkenandt, Aalen (DE); Bruno Neuhaus, Aalen (DE)

(73) Assignee: Carl-Zeiss-Stiftung (DE)

( * ) Notice: Subject to any disclaimer, the term of this patent is extended or adjusted under 35 U.S.C. 154(b) by 35 days.

(21) Appl. No.: 09/818,124

(22) Filed: Mar. 26, 2001

(65) Prior Publication Data

US 2002/0021437 A1 Feb. 21, 2002

(30) Foreign Application Priority Data

Mar. 24, 2000 (DE) .......................... 100 14 334

(51) Int. Cl.$^7$ .......................... G01B 9/00; G01M 11/00
(52) U.S. Cl. .......................... 356/127; 356/124.5
(58) Field of Search .......................... 356/124, 127, 356/125, 124.5; 351/169; 359/626

(56) References Cited

U.S. PATENT DOCUMENTS

| | | | | |
|---|---|---|---|---|
| 4,180,325 A | * | 12/1979 | Humphrey | 356/127 |
| 4,606,622 A | | 8/1986 | Fuëter et al. | 351/169 |
| 5,243,619 A | * | 9/1993 | Albers et al. | 359/495 |
| 5,294,971 A | | 3/1994 | Braunecker et al. | 356/121 |
| 5,319,496 A | * | 6/1994 | Jewell et al. | 359/619 |
| 5,352,886 A | * | 10/1994 | Kane | 250/208.2 |
| 5,825,476 A | | 10/1998 | Abitol et al. | 356/124 |
| 5,896,194 A | | 4/1999 | Yanagi et al. | 356/124 |

FOREIGN PATENT DOCUMENTS

| | | |
|---|---|---|
| DE | 33 182 93 A1 | 12/1983 |
| DE | 196 24 421 A1 | 1/1997 |
| DE | 197 58 338 A1 | 6/1998 |
| DE | 198 00 844 A1 | 7/1999 |
| WO | WO 95/34800 | 12/1995 |

OTHER PUBLICATIONS

Optical ShopTesting, Edited by D.I Malacara, Chapter 10, "Hartmann and Other Screen Tests", by I. Ghozeil, pp. 323–349, Wiley, New York, 1978; and Second Edition, pp. 367–369, 1992.

"Testing and cetering of lenses by means of a Hartmann test with four holes", byDaniel Malacara, in Optical Engineering, Jul., 1992, vol. 31, No. 7, pp. 1551–1555.

\* cited by examiner

*Primary Examiner*—Ricky Mack

(57) ABSTRACT

Apparatus for the spatially resolved determination of the refractive power distribution of an optical element, with a light source unit for illuminating the optical element with an extended pencil of rays, includes a first multi hole screen for the production of a first number of beam pencils, a spatially resolving detector, and a computing unit. A controllable manipulator is arranged before or after the first multi hole screen. The first multi hole screen and the manipulator are transmissive only for a second number of beam pencils, the second number being smaller than the first number but greater than unity. The measurement principle of the apparatus corresponds to that of a Hartmann wavefront sensor.

25 Claims, 5 Drawing Sheets

APPARATUS AND PROCESS FOR SPATIALLY RESOLVED REFRACTIVE POWER DETERMINATION

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to an apparatus and a process for the spatially resolved determination of the refractive power distribution of an optical element.

BACKGROUND TECHNOLOGY

Progressive spectacle lenses are increasingly used in ophthalmic optics. They have several different surface refractive values, with a continuous transition between the various regions. In such lenses, for example those known from European Patent EP-A-0 039 497, at least one of their surfaces departs from a rotationally symmetrical shape.

The Hartmann process appears to be practicable for the quality testing of these aspheric lenses, since other methods, for example mechanical measuring processes with sensing heads or interferometric testing, are too slow, too expensive, or too sensitive to adjustments.

In the extrafocal method of J. Hartmann, dating from the year 1900, a diaphragm with two small holes placed symmetrically with respect to the optical axis is arranged close in front of the optical element to be tested. The focal length and the spherical aberration can be determined with two measurements in front of and behind the focal plane of the optical element, with varying hole spacing.

Testing of objectives according to Hartmann is known, for example, from German Patent DE 3318293 A1.

The Hartmann test in variants, and also the evaluation theory, are described in D. Malacara, Optical Shop Testing, Chapter 10, I. Ghoziel, Hartmann and Other Screen Tests, p. 323 ff., Wiley, New York, 1978.

A modified and simplified variant of the Hartmann test is described in OPTICAL ENGINEERING, Vol. 31, No. 7, July 1992, Bellingham, Wash., U.S., pp. 1551–1555, XP289274, D. Malacara et al., "Testing and centering of lenses by means of a Hartmann test with four holes". The multi hole screen produces only four beam pencils there. This measurement method cannot be used for the measurement of spectacle lenses, since the spatial resolution is too low.

Measuring devices for the quality testing of spectacle lenses based on the Hartmann process are known from U.S. Pat. No. 5,825,476. With a multi hole screen or a lens array, the wavefront to be investigated is decomposed into individual beam pencils. These produce intensity peaks on a diffusing screen. By means of a reducing intermediate imaging, the intensity pattern is recorded by a CCD camera, for example. The distribution of refractive power of the lens being investigated is obtained with a subsequent computer unit from the analysis of the CCD image. The sharpness of the intensity peaks produced by the multi hole screen or the lens array is decreased by the use of the ground glass screen. Additional measurement errors are introduced by the reducing intermediate imaging of the ground glass screen on the detector.

European Patent EP 0 466 881 B1 describes wavefront measurement with many different coded arrangements of holes in the beam path. The requirements for stability and adjustment of the steppable multi hole screen in the beam path are then very high, in order to attain a consistent measurement result from several measurements. In order to increase the measurement accuracy, a calibration measurement would be required after each stepping of the multi hole screen. The measuring device contains a focusing optical system and a spatially resolving detector which is arranged in the neighborhood of the focal plane of the focusing system. The focusing optical system then has to be exceptionally well corrected in order to exert no negative influence on the wavefront to be investigated. The optical construction thus becomes very expensive.

SUMMARY OF THE INVENTION

The invention therefore has as its object an apparatus for the spatially resolved refractive power measurement of an optical element, having a simple construction and with which the highest accuracy with respect to spatial resolution can be realized in a short measurement time.

This object is attained with an apparatus for spatially resolved determination of refractive power distribution of an optical element, comprising a light source unit for illuminating said optical element with an extended pencil of rays, a first multi hole screen for production of a first number of beam pencils, a spatially resolving detector (211), a computing unit, and a manipulator arranged either before or after said first multi hole screen, wherein said manipulator is controllable, a combination of said first multi hole screen manipulator is only transmissive for a second and said number of beam pencils, and said second number is smaller than said first number and greater than unity and a process for spatially resolved determination of refractive power distribution of an optical element comprising illuminating said optical element with an extended pencil of rays, producing a first number of beam pencils, reducing said first number of beam pencils to a second number of beam pencils, the second number being greater than unity, sensing spatially separated intensity peaks with a spatially resolving detector wherein the number of said spatially separated intensity peaks is equal to said second number of beam pencils, and calculating said refractive power distribution of the optical element with a computing unit. Advantageous developments of the invention will become apparent from the features of the invention.

The apparatus according to the invention accordingly includes a light source unit, a first multi hole screen and a controllable manipulator, a spatially resolving detector, and a computing unit. The light source unit includes a light source, such as for example a laser light source or a thermal lamp with a multi hole screen arranged in series with it, and reflective and/or refractive components for the production of an expanded pencil of rays with which the optical element to be investigated is illuminated. The optical element to be investigated locally influences the propagation of the pencil of rays. This influence can be measured with the combination of first multi hole screen and manipulator.

A first number of beam pencils is produced with the first multi hole screen. The multi hole screen selects beam pencils from the incident pencil of rays, in correspondence with the number of holes. The rays of each beam pencil represent the region of the optical element to be investigated through which they have passed. It is therefore possible to calculate back from the course of the individual beam pencils to the refractive power distribution of the optical element to be investigated. When the beam pencils strike the spatially resolving detector, they produce individual gaussian intensity peaks, the position of whose centers of gravity is determined by means of a subsequent evaluation algorithm in the computing unit. The refractive power distribution of the optical element to be investigated can be determined knowing the generation and detection points of a beam pencil. Evaluation algorithms are to be found, for example, in the publications of Malacara or in the cited documents.

In order to prevent the individual intensity peaks overlapping due to high positive local refractive power of the optical element to be investigated, a manipulator is provided which reduces the number of beam pencils. This manipulator can be an interchangeable second multi hole screen; electro-optical shutter blades, for example, a LCD (liquid crystal device) screen; or a micro-mirror array with individually controllable micro-mirrors, for example from Texas Instruments. With this controllable manipulator, it is possible to select the beam pencils such that the beam pencils do not intersect due to the locally varying refractive power distribution. The control is effected by the interchange of the multi hole screen when a multi hole screen is used, by the transparent/opaque switching of individual pixels in a LCD screen, or by the selective alignment of individual small mirrors in the case of a micro-mirror array. It is for example possible to qualify the whole product palette of spectacle lenses, and in particular progressive spectacle lenses, in the region of ±12 dpt.

The sequence of first multi hole screen and manipulator is determined by the design of the manipulator. It is possible for the manipulator to be installed in front of the first multi hole screen. Optical components, such as mirrors or lenses, can be provided between the manipulator and the first multi hole screen for enlarged or reduced imaging of the manipulator on the first multi hole screen.

When a first and second multi hole screen are used as the first multi hole screen and manipulator, it is desirable for the two multi hole screens to directly follow one after the other.

The hole arrangement on the first multi hole screen is advantageously matched to the detector so that each beam pencil emitted from a hole of the first multi hole screen generates a resolvable signal in the detector. It is advantageous to determine the minimum hole spacing, without the optical element to be investigated and without the manipulator, such that the maximum possible number of beam pencils strike the detector in a spatially separated manner.

If the optical element is to be investigated within a circular or rectangular region, the hole spacing on the first multi hole screen is at most $1/30$, preferably $1/50$, of the diameter of the circular region or of the shorter side of the rectangle. Advantageous hole spacings are in the region between 1 mm and 2 mm. The holes of the first multi hole screen can be arranged on a regular grid, for example a grid of rows and columns or a grid with equidistant hole spacing from hole to adjacent hole. A regular arrangement facilitates evaluation. For the qualification of progressive spectacle lenses with a near-vision zone and a far-vision zone, it can be desirable to match the hole arrangement to the refractive power distribution, the hole density being increased, for example, within the near vision zone.

The optical element to be investigated, due to its refractive power distribution, can lead to the superposition of the intensity peaks. The number of beam pencils is therefore reduced with the manipulator. The hole density of the second multi hole screen is individually matched to the refractive power distribution of the optical element to be investigated. For a spherical positive lens, this can mean, for example, that because of the second multi hole screen only every second (or every third) beam pencil produced by the first multi hole screen reaches the detector. For a progressive spectacle lens, the local hole density of the second multi hole screen is advantageously matched to the refractive power distribution and therefore is not regular.

It is advantageous if a large number of spatially separated beam pencils strike the detector and can be evaluated, in order to reduce the measurement time at a high spatial resolution. Ideally, more than 100 beam pencils participate in the evaluation.

So that the intensity peaks on the detector can be individually resolved, the individual beam pencils are advantageously spatially limited by the first multi hole screen. Each hole of the first multi hole screen cuts out a circular beam pencil from the pencil of rays incident on the first multi hole screen. It is desirable to select the hole diameter between 0.2 mm and 0.3 mm.

The manipulator advantageously serves for the selection and reduction of the beam pencils and not for beam limiting. If the manipulator is arranged after the first multi hole screen, the beam pencils are already shaped by the first multi hole screen and are passed through, or else wholly vignetted, by the manipulator. If the manipulator is arranged before the first multi hole screen, the manipulator first produces and delimits the beam pencils. However, these as a rule have too great a diameter. The following first multi hole screen limits the beam pencils to the desired diameter.

When a first and second multi hole screen are used for the first multi hole screen and the manipulator, the holes of the first multi hole screen determine the size of the beam pencils. Since the second multi hole screen only performs selection, the diameter of the holes of the second multi hole screen can be chosen larger. Advantageously, they are at least twice as large as the holes of the first multi hole screen. This has the advantage that the two multi hole screens can be mutually displaced by the difference of the hole diameters of the first and second multi hole screens, without this having a negative effect on the measurement result. When just changing the second multi hole screen, it is desirable for the accuracy of positioning to have finite values, for example, the hole diameter of the holes of the first multi hole screen. The separation into production and selection of the beam pencils makes possible, with a simple measuring construction, a rapid and flexible qualification of optical elements with greatly varying refractive powers.

In order to be able to match the hole arrangement of the second multi hole screen to the optical element to be investigated, it is desirable to have available a module with which the second multi hole screen can be interchanged. This module can be, for example, a rotatably mounted disk, on the periphery of which several second multi hole screens are arranged, a one of the second multi hole screens being located in the beam path at any given time. Different second multi hole screens can be brought into the beam path by rotating the disk, which is arranged perpendicular to the beam path. Another possibility is a sliding device. A supply magazine with second multi hole screens is also realizable, the interchange taking place by means of a robot arm.

In order to make use of the measuring apparatus for serial testing, it is advantageous if a module, for example a robot, is provided for changing the optical element to be investigated.

So that the beam pencils run collimated, up to diffraction spreading, after the first multi hole screen, it is advantageous to use an approximately point light source. This is attained, for example, by means of a multi hole screen after a thermal light source. Laser light sources with small source divergence likewise fulfill this property.

The evaluation is facilitated if the first multi hole screen is illuminated with an approximately plane wave. The beam pencils then run parallel, up to diffraction spreading, between the first multi hole screen and the detector if the optical element to be investigated is removed from the beam path. The hole arrangement of the first multi hole screen can thus be used for calibration.

A particularly desirable construction of the measuring apparatus results if no transparent optical elements are present in the beam path between the first multi hole screen and manipulator on the one hand and the detector on the other hand. The beam pencils propagate linearly from the first multi hole screen to the detector without being affected by an intermediate imaging subject to aberration. The sources of error are therefore reduced to a minimum. This is particularly desirable in the case of illumination with an approximately plane wave, since the hole arrangement of the first multi hole screen can then be used directly as the reference.

The construction without intermediate imaging requires a spatially resolving detector whose extent is matched to the region of the optical element to be investigated. For the qualification of spectacle lenses with diameters of 70 mm it is desirable if the spatially resolving detector likewise has a diameter of 70 mm or larger. If such a detector which covers the whole measurement region is not available, the detector can also be scanned over the measurement region. A line detector which is scanned perpendicularly of the lines can also be used.

In order to prevent ghost images at the detector, it is advantageous to provide anti-reflective treatment of the first multi hole screen and the manipulator for the light source wavelength region which is used. When multi hole screen plates are used, it is desirable to blacken the regions between the holes, and to provide the transparent holes with an anti-reflection layer.

The invention also relates to a process for the spatially resolved determination of the refractive power distribution of an optical element. The optical element, which is located between a source and a spatially resolving detector, is then illuminated with an extended pencil of rays which is split, before or after the optical element to be investigated, into a first number of beam pencils. The first number of beam pencils is advantageously reduced to a second number in such a manner that a number of spatially resolved intensity peaks is sensed by the detector, and corresponds to the second number. The refractive power distribution of the optical element to be investigated is determined from the distribution of the intensity peaks on the detector.

The reduction of the first number of beam pencils takes place with a manipulator. An interchangeable multi hole screen can for example be used as the manipulator. The use is also possible or an electro-optical shutter mask or a controllable micro-mirror array as the manipulator.

If a module for interchanging the optical element is provided, serial testing of optical elements, for example, progressive spectacle lenses, can be realized simply. The optical element is introduced into the beam path, and the computing unit obtains a signal which is characteristic for the optical element. For example, a scanner can read the bar code on the mounting of the optical element. This signal makes it possible for the computing unit to allocate a stored reference refractive power distribution to the optical element. Based on the reference refractive power distribution, the computing unit determines the control of the manipulator. This can mean, for example, that a matching multi hole screen is brought into the beam path, or that individual pixels of the electro-optical shutter mask are switched to opaque, or that individual beam pencils are deflected by the micro-mirror so that they do not reach the detector. The first number of beam pencils can be reduced with the manipulator to the second number in a manner such that the intensity peaks on the detector can be sensed in a spatially separated manner. The refractive power distribution of the optical element can be determined from these intensity peaks. If it departs from the reference refractive power distribution by more than a predetermined tolerance, the optical element is characterized as outside tolerance. The difference distribution can also be used for the after-processing of the optical element.

If an optical element has a high positive refractive power, this can easily lead to an overlapping of the intensity peaks on the detector. The number of beam pencils must therefore be reduced. On the other hand, the spatial resolution and the measurement accuracy are decreased by the reduction of the beam pencils. In order to be able to qualify an optical element with high spatial resolution, the optical element is advantageously evaluated with different arrangements of beam pencils. This can be realized in a simple manner by the control of the manipulator.

The invention has succeeded in providing a measuring apparatus and a measuring process with which it is possible in a simple manner to determine with highest resolution the refractive power distribution of an optical element. For the qualification of a wide spectrum of optical elements with different refractive power distribution according to the Hartmann process, it is desirable to be able to vary the number and position of the beam pencils. In order not to have to perform a new calibration before each measurement, the invention proposes to carry out in two steps the generation and selection of the beam pencils. This was attained by the combination of a first multi hole screen and a manipulator. The beam pencils can be switched on and off by a manipulator.

BRIEF DESCRIPTION OF THE DRAWINGS

The invention will be described in greater detail with reference to the accompanying drawings.

DETAILED DESCRIPTION OF PREFERRED EMBODIMENTS

Figure 1:
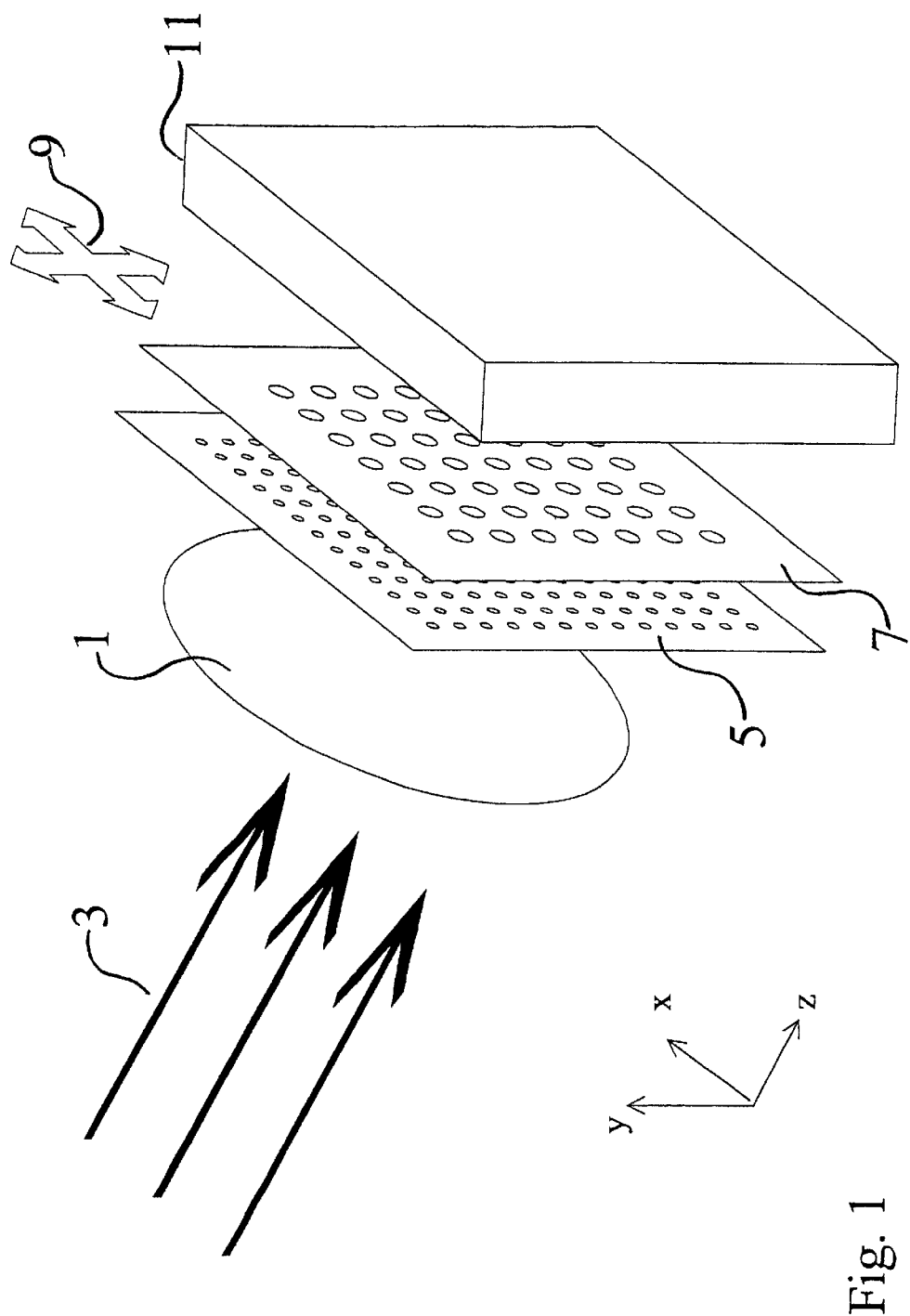
FIG. 1 shows a perspective view of a wavefront measuring apparatus according to the invention, with first and second multi hole screens.

FIG. 1 shows an embodiment example of a wavefront measuring apparatus according to the invention. An optical element 1, for example, a spectacle lens, is illuminated with a parallel pencil of rays 3. The parallel pencil of rays 3 runs parallel to the z direction. The first multi hole screen 5 arranged behind the optical element 1 in the beam direction produces a first number of beam pencils which are emitted from the holes of the first multi hole screen 5. A second multi hole screen 7 with smaller hole density and with holes of greater diameter reduces the number of beam pencils to a second number of beam pencils. While the first multi hole screen 5 produces the beam pencils, the second multi hole screen 7 gives rise to a selection of the beam pencils. Since the second multi hole screen 7 is interchangeable and/or displaceable in the multi hole screen plane, this selection can be matched to the refractive power distribution of the optical element 1 to be investigated. A module 9 for the interchange or displacement of the second multi hole screen 7 in the x and y directions is indicated as a double arrow. The requirements on the positioning accuracy of the second multi hole screen 7 are reduced because of the greater hole diameter.

The second number of beam pencils strikes the detector 11 and produces a like number of intensity peaks there. The hole arrangement on the second multi hole screen 7 is chosen so that the intensity peaks are spatially separated on the entrance surface of the detector 11. The position of the intensity peaks in comparison with the position without deflection, i.e., without the optical element 1, is a measure of the local refractive power of the optical element 1 at the point where the beam pencil passes through which produces the intensity peak.

The size of the detector 11 is chosen so that the measurement field of interest, with a diameter of about 50 mm, is completely covered. Corresponding large-surface CCD detectors 11 have only recently become commercially available and contain at least 2,000×2,000 pixels. At present the maximum pixel number is 4,000×7,000 pixels, about corresponding to a detector surface of 48 mm×84 mm. A CCD detector of this kind is commercially obtainable from Philips.

Particularly with a large positive dioptric power of the optical element 1, for example a spectacle lens, the intensity peaks on the entrance surface of the detector 11 can come to be situated adjacently, so that they can no longer be individually resolved. This limit is reached at about 10 dpt with commercial measuring apparatuses.

If now every second beam pencil is stopped by a second multi hole screen 7, all the remaining intensity peaks are again separable on the detector 11. In further measurement steps, the deflection of the previously stopped-out intensity peaks is detected by a horizontal and vertical displacement of this second multi hole screen 7 by means of the module 9. The total measurement time is thereby admittedly increased fourfold, but is still in the time range of under a minute. The stopping-out of individual light points does not place any high requirements on dimensional accuracy and positioning accuracy of the second multi hole screen 7. The accuracy depends solely on the positioning accuracy of measurement and the stable mounting of the optical element 1, the first multi hole screen 5, and the detector 11.

It is also possible to replace the second multi hole screen 7 in FIG. 1 by an electro-optical shutter mask, for example a LCD (liquid crystal device) screen. The beam pencils are defined in arrangement and extent by the first multi hole screen 5, while only the number of the beam pencils passing through is affected by the electro-optical closure mask. The size of the transparent regions of the individual pixels of the electro-optical shutter mask is then to be larger than the hole size on the first multi hole screen 5. The advantage of an electro-optical closure mask is that each pixel can be individually controlled and thus the arrangement of the beam pencils can be optionally affected. The possibility of rapidly changing the stop arrangement and matching it to the respective optical element 1 to be measured is also ideally attained with the electro-optical shutter mask.

Figure 2:
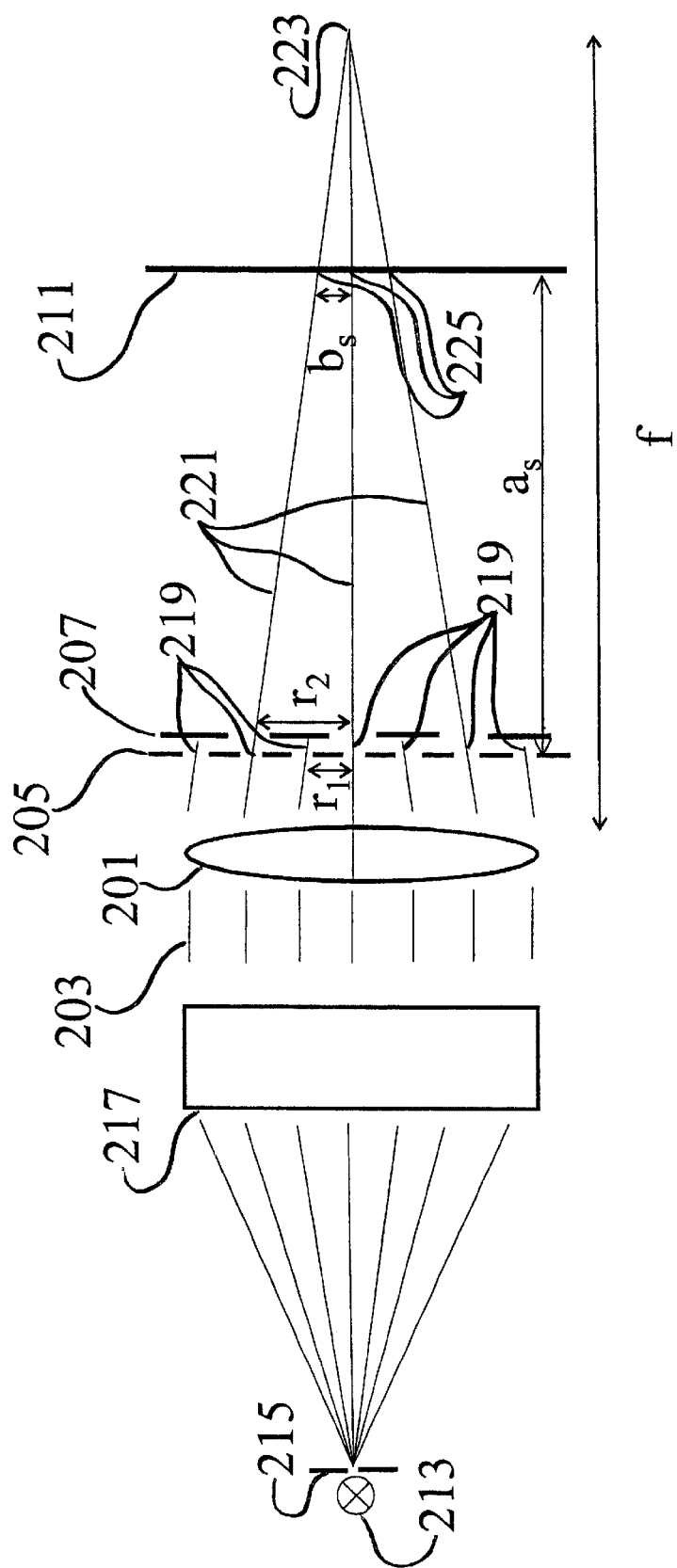
FIG. 2 shows a sketch of principle of the wavefront measuring apparatus of FIG. 1, in section to explain the abbreviations used in the derivation of the maximum measurement region.

FIG. 2 shows a sketch of the principle of the measuring structure, in side view. The elements in FIG. 2 corresponding to those in FIG. 1 have the same reference numbers as in FIG. 1, increased by the number 200. Reference is made to the description of FIG. 1 for a description of these elements. A halogen lamp with a following multi hole screen 215 is provided as the light source 213. An illuminating optics 217 produces an approximately parallel pencil of rays 203. The optical element 201 to be investigated, for example a spectacle lens, is thus illuminated with an approximately plane wave. The optical element 201 is followed by a first multi hole screen 205 for the production of a first number of beam pencils 219. Seven beam pencils 219 are shown in this qualitative example. The first number of beam pencils 219 is reduced by a second multi hole screen 207 to a second number of beam pencils 221: three beam pencils 221 are shown in the example. The hole spacing $r_2$ of the second multi hole screen 207 is double the hole spacing $r_1$ of the first multi hole screen 205. For an optical element 201 with positive refractive power, the beam pencils 221 converge to the focus 223 situated at the distance of the focal length f. The spatially resolving detector 211, for example a CCD camera, is installed at a distance $a_s$ from the first multi hole screen 205, and the second number of beam pencils 221 produces gaussian intensity peaks 225 at its entrance surface.

For the calculation of the maximum possible measurement region in dependence on:
- the refractive power D of the optical element 201,
- the distance $r_2$ of the beam pencil 221, which is given by the hole spacing $r_2$ of the second multi hole screen 207,
- the spacing $b_S$ of the intensity peaks 225 at the entrance surface of the detector 211, and
- the distance $a_s$ of the first multi hole screen 205 from the detector 211, the following equation is given:

$$D = \frac{r_2 - b_s}{a_s \, r_2} \cdot 1000 \; \frac{dpt}{mm}$$

D=dioptric power of the optical element 201
$r_2$=hole spacing on the second multi hole screen, mm
$b_S$=spacing of the intensity peaks 225, mm
$a_S$=measurement distance between the first multi hole screen 205 and the detector 211, mm.

The course of two beam pencils is considered: the middle beam pencil through the middle hole of the multi hole screen 207, and one of its nearest neighbors. The limitation of the measurement region is given by the maintenance of a minimum spacing $b_S$ of the intensity peaks 225 on the detector surface 211 such that both intensity peaks 225 can be separately resolved. With a diameter of the intensity peak 225 of 0.5 mm and a predetermined minimum spacing of the peak edges of 0.1 mm, there results a spacing of the intensity peaks 225 of $b_s$=0.6 mm. For a typical measurement distance as 50 mm and a spacing $r_2$=1.0 mm of the beam pencils after the two multi hole screens, a measurement region limit of 8 dpt results according to the above equation.

If the spacing of the beam pencils 221 is changed to twice the value, by stopping out using the second multi hole screen 207, the measurement region is already increased to 14 dpt.

Table 1 gives the measurement region limitations for three different spacings $r_2$ of the beam pencils 221.

TABLE 1

| Diameter of intensity peak | Beam pencil spacing after first and second multi hole screens combined | Spacing of intensity peaks on the detector surface | Measurement distance between detector and first multi hole screen | Maximum possible refractive power of the measurement sample |
|---|---|---|---|---|
| 0.5 mm | 1 mm | 0.6 mm | 50 mm | 8 dpt |
| 0.5 mm | 1.5 mm | 0.6 mm | 50 mm | 12 dpt |
| 0.5 mm | 2 mm | 0.6 mm | 50 mm | 14 dpt |

Extremely large dioptric values of more than 25 dpt can only be sensed if the spacing between the beam pencils 221 is correspondingly increased by means of the second first multi hole screen 207. Since the multi hole screen 205 remains as the reference in the beam path, the spacing of the beam pencils 221 can be changed without recalibration.

Figure 3:
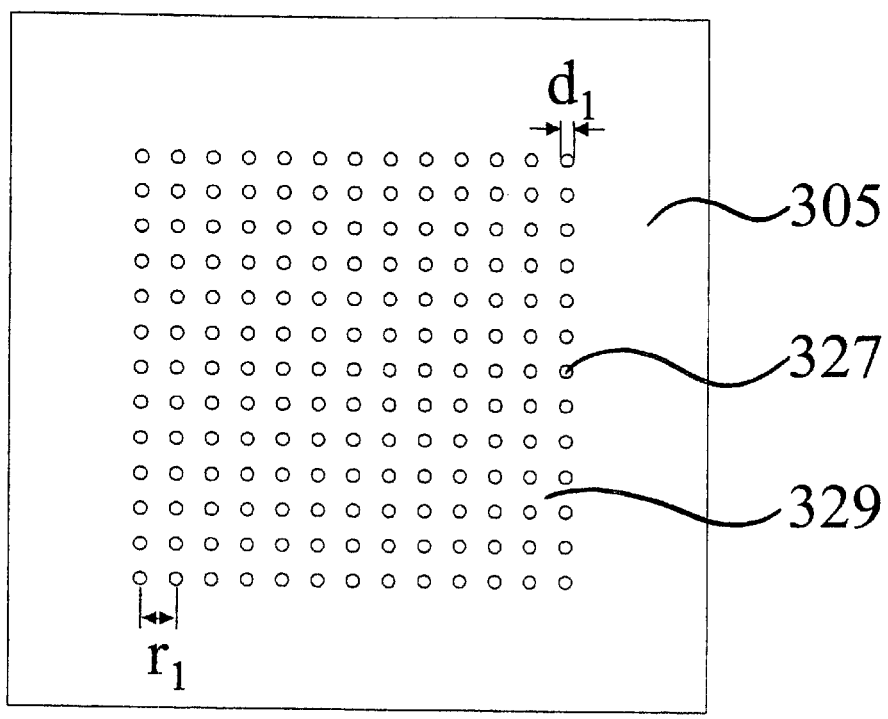
FIG. 3 shows a view of an embodiment of a first multi hole screen.

FIG. 3 shows an embodiment example of a first multi hole screen 305. For the purpose of illustration, the size of the holes 327 is exaggerated, and only a portion of the holes 327 is shown. The first multi hole screen 305 typically contains more than 30×30 holes 327. In order to be able to use the first multi hole screen 305 with all typical spectacle lens formats, the size of the first multi hole screen is to be 70 mm×70 mm or more. An optimum raster spacing $r_1$ is between 1 mm and 2 mm. A hole diameter $d_1$ which is optimized with respect to diffraction is between 0.2 and 0.3 mm, as is evident from the following calculation.

The limiting angle of an intensity peak enlarged by diffraction is determined from:

$p = 1.22 \cdot \lambda / d_1$ with:

p=limiting angle $\lambda$=wavelength $d_1$=hole diameter of the holes 327 on the first multi hole screen 305.

For a measurement distance $a_S$=50 mm, the diameters given in Table 2 result for the intensity peaks on the detector surface.

TABLE 2

| HOLE DIAMETER D1 (MM) | DIAMETER OF THE INTENSITY PEAK (MM) |
|---|---|
| 0.1 | 0.1 + 0.44 = 0.54 |
| 0.2 | 0.2 + 0.33 = 0.53 |
| 0.3 | 0.3 + 0.22 = 0.52 |
| 0.4 | 0.4 + 0.17 = 0.57 |

With decreasing hole diameter $d_1$, diffraction leads to an increase of the diameter of the intensity peaks. For a projection distance of 50 mm, an optimum hole diameter $d_1$ of 0.3 mm therefore results for a minimum diameter of the intensity peaks on the detector surface.

To prevent troublesome reflections, the multi hole screen plates are to be blackened in the regions 329 between the holes, and are to be provided in the passage zones with an anti-reflection coating for the wavelength spectrum $\lambda_0 \pm \Delta\lambda$ of the light radiated by the light source.

Figure 4:
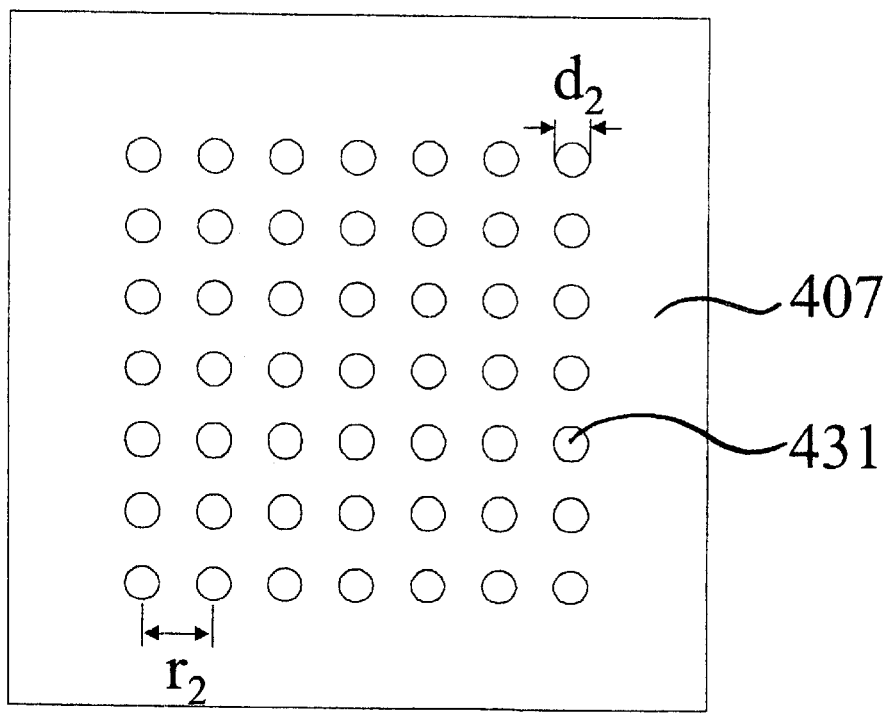
FIG. 4 shows a view of an embodiment of a second multi hole screen.

FIG. 4 shows an embodiment example of a second multi hole screen 407 with a doubled hole spacing $r_2$ in comparison with the first multi hole screen 305 shown in FIG. 3. Thus every second beam pencil is passed through per line. The previously vignetted beam pencils are detected in the subsequent measurement steps by horizontal and vertical displacement of the second multi hole screen 407 by half its raster measurement $r_2/2$. The hole diameter $d_2$ of the holes 431 of the second multi hole screen 407 is not critical. It should be greater than the hole diameter $d_1$ of the first multi hole screen 305 used. A doubled hole diameter $d_2 = 2 \cdot d_1$ has been found to be practicable. The hole diameter $d_2$ on the second multi hole screen 407 is to lie in the region $d_1 < d_2 < 2 \cdot d_1$. The size of the holes 431 is exaggerated for the purposes of illustration, and only a portion of the holes 431 is shown. The second multi hole screen 407 typically contains more than a hundred holes 431, so that a correspondingly large number of beam pencils strike the detector.

Figure 5:
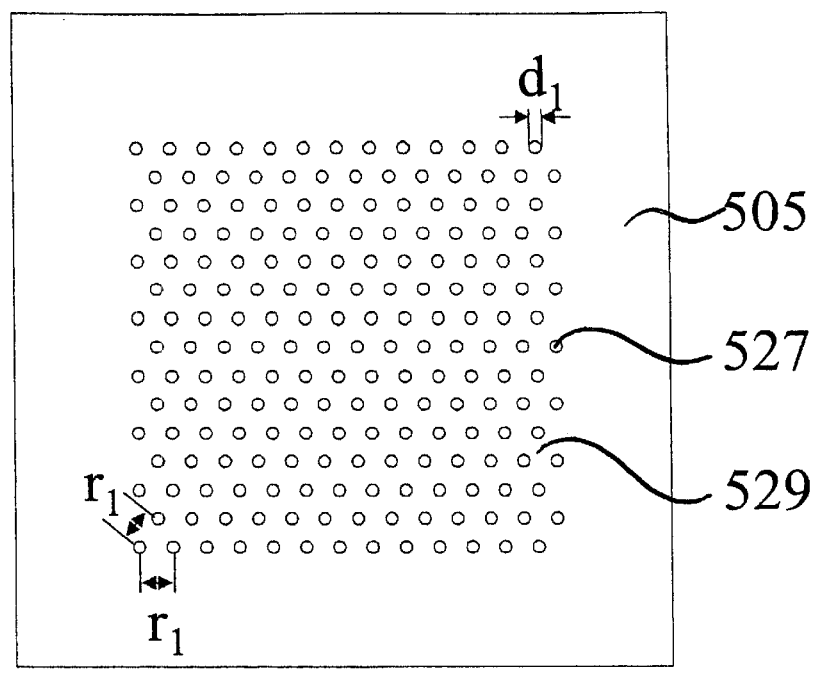
FIGS. 5 and 6 show views of further embodiments of a first multi hole screen.

A further embodiment example of a first multi hole screen 505 is shown in FIG. 5. The elements in FIG. 5 corresponding to the elements of FIG. 3 have the same reference numbers, increased by the numeral 200. Reference is made to the description of FIG. 3 for a description of these elements. Such a hole arrangement has a single hole distance to all neighbors. This makes possible a more uniform and more consistent spatial measurement of the optical element than is the case with a square arrangement as in FIG. 3.

Figure 6:
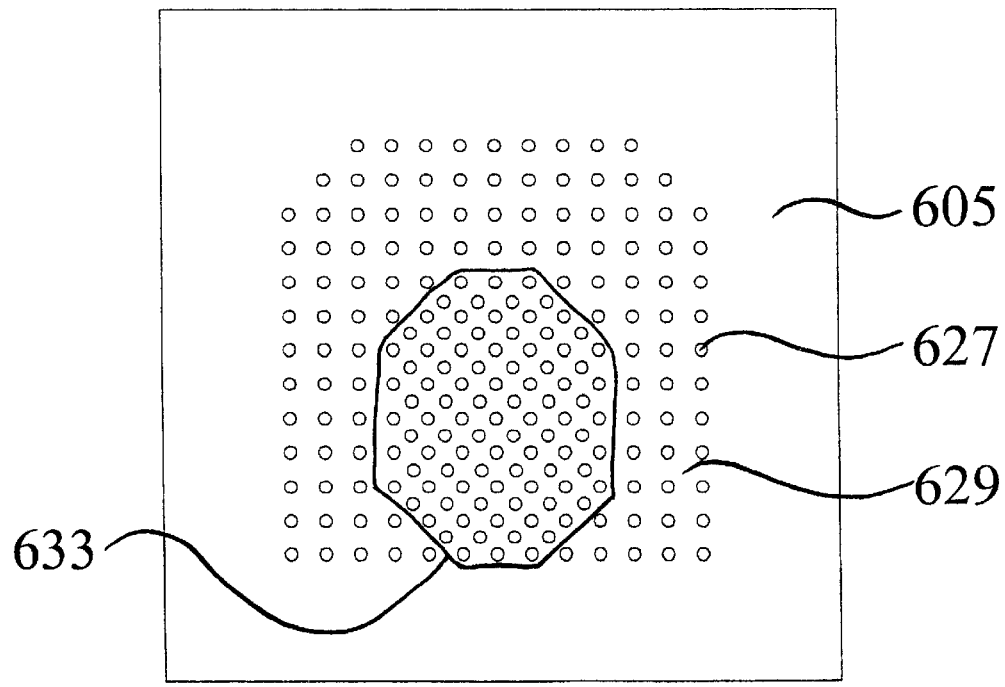

A further embodiment example of a first multi hole screen 605 is shown in FIG. 6, and has a hole arrangement which is especially suited to the measurement of bifocal or progressive spectacle lenses with a near-vision zone and a far-vision zone. The elements in FIG. 6 corresponding to the elements of FIG. 3 have the same reference numbers, increased by the numeral 300. Reference is made to the description of FIG. 3 for a description of these elements. In a continuous region which corresponds to the region of the near-vision zone of the spectacle lens and which is enclosed by a boundary line given the reference number 633, the hole density is double that in the remaining regions. In FIG. 6, only a portion of the holes are shown, with exaggerated diameter in order to show qualitatively the manner of hole arrangement in the first multi hole screen 605.

In a first multi hole screen 605 according to FIG. 6, it is to be expected that the beam pencils of the near-vision zone 633 lead to overlapping intensity peaks on the detector. It is particularly desirable here to stop out with the second multi hole screen 605, individual beam pencils in the near-vision zone 633. In order nevertheless to be able to make use of the high spatial resolution using all of the beam pencils produced by the first multi hole screen 605, all the beam pencils can be detected in several successive measurements with different hole arrangements of the second multi hole screen. This can be realized particularly easily with an electro-optic shutter mask.

Besides the discrete change between a first constant hole density for the near-vision zone 633 and a second constant hole density for the remaining region of the spectacle lens, it is desirable in a further embodiment for the hole density to vary continuously. For example, the local hole density can be matched to the refractive power distribution. For example, a high hole density is provided in the region of a high gradient of refractive power, and a lower hole density in the region of a lower gradient of refractive power.

Figure 7:
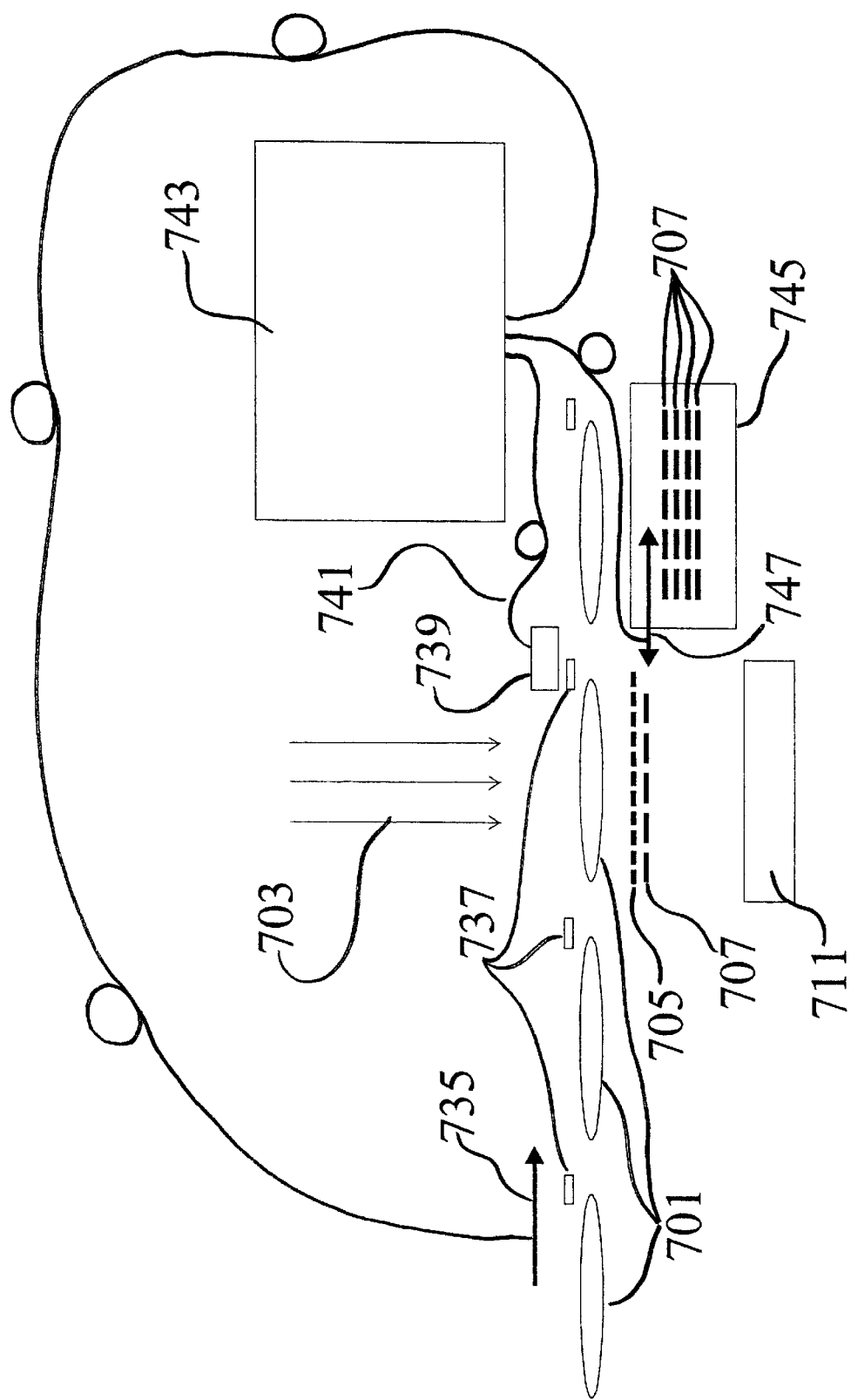
FIG. 7 shows the schematic construction of an automated measuring apparatus.

FIG. 7 shows the use of the measuring apparatus according to the invention in automated production control. The elements in FIG. 7 corresponding to the elements of FIG. 1 have the same reference numbers, increased by the numeral 700. Reference is made to the description of FIG. 1 for a description of these elements. The optical elements 701, for example spectacle lenses, are situated on a conveyor belt 735 indicated as an arrow 735 and are placed in the measuring equipment by a robot arm. Other transport and change mechanisms can of course be realized. The optical elements 701 or their holders are provided with an identification 737, for example a bar code. This identification 737 is sensed by a reading device 739 and passed as a signal over the signal lead 741 to the computer unit 743, for example, a PC or a workstation. The computing unit 743 controls the complete course of the measurement. The reference refractive power distributions of the optical elements 701 to be investigated and the hole arrangements of the second multi hole screens 707 deposited in a magazine 745 are stored in the computing unit 743. The optical elements 701 has its reference refractive power distribution allocated to it, based on the received signal. Based on the reference refractive power distribution, the computing unit 743 selects the matching second multi hole screen 707 from the available second multi hole screens 707. It is also possible to make use of several multi hole screens 707 with different hole arrangements, used one after another. According to the positioning of the second multi hole screen 707 in the beam path, for example by means of a robot arm 747 or a diaphragm wheel, the measurement of the optical elements 701 takes place with subsequent calculation of the actual refractive power distribution. The optical elements 701 can be evaluated by the computing unit according to predetermined tolerance values, based on the difference of the reference and actual refractive power distributions.

If an electro-optical shutter mask is used instead of the second multi hole screen 707, the computing unit computes the control of the individual pixels of the electro-optical shutter matrix, using the reference refractive power distribution.

We claim:

1. An apparatus for spatially resolved determination of refractive power distribution of an optical element comprising a light source unit for illuminating said optical element with an extended pencil of rays, a first multi hole screen for production of a first number of beam pencils, a spatially resolving detector, a computing unit, and a manipulator arranged either before or after said first multi hole screen, wherein said manipulator is controllable, a combination of said first multi hole screen and said manipulator is only transmissive for a second number of beam pencils, and said second number is smaller than said first number and greater than unity.

2. The apparatus according to claim 1, wherein said manipulator comprises a second multi hole screen.

3. The apparatus according to claim 2, wherein said second multi hole screen is arranged directly before or after said first multi hole screen.

4. The apparatus according to claim 2, wherein said second multi hole screen comprises an interchangeable diaphragm.

5. The apparatus according to claim 1, wherein a minimum hole spacing of said first multi hole screen has a size such that said first number of beam pencils, with said optical element not in a beam path and with said manipulator not in said beam path, produces on an entrance surface of said detector the same number of spatially separated intensity peaks as said first number.

6. The apparatus according to claim 5, wherein said hole spacing on said first multi hole screen is at most 1/30, of a lateral extent of a region to be investigated of said optical element.

7. The apparatus according to claim 2, wherein a hole arrangement of said second multi hole screen is matched to said refractive power distribution of said optical element such that said second number of beam pencils produces on an entrance surface of said detector the same number of spatially separated intensity peaks as said second number of beam pencils.

8. The apparatus according to claim 1, wherein the number of spatially separated intensity peaks on an entrance surface of said detector is greater than one hundred.

9. The apparatus according to claim 1, wherein said second number of beam pencils is exclusively limited by holes of said first multi hole screen.

10. The apparatus according to claim 9, wherein said holes of said first multi hole screen have a first diameter and holes of said second multi hole screen have a second diameter, and lateral positioning accuracy of said second multi hole screen to said first multi hole screen is smaller than an absolute value of a difference of said first and second diameters.

11. The apparatus according to claim 2, further comprising a module for changing said second multi hole screen.

12. The apparatus according to claim 11, further comprising a magazine with several second multi hole screens of different hole arrangement, and said second multi hole screen is selectable under control of said computing unit.

13. The apparatus according to claim 1, further comprising a module for changing said optical element.

14. The apparatus according to claim 1, wherein said light source unit contains an effectively approximate point light source.

15. The apparatus according to claim 1, wherein said optical element is illuminated with an approximately plane wave.

16. The apparatus according to claim 1, wherein said first multi hole screen and said manipulator are arranged after said optical element, and said detector follows after said first multi hole screen and said manipulator without interposition of further transparent elements.

17. The apparatus according to claim 1, wherein said detector has a first lateral extent, a region to be investigated of said optical element has a second lateral extent, and said first lateral extent is greater than said second lateral extent.

18. The apparatus according to claim 2, wherein said light source produces light within a wavelength region $\lambda_0 \pm \Delta\lambda$, and said first and second multi hole screens are anti-reflective for said wavelength region $\lambda_0 \pm \Delta\lambda$.

19. A process for spatially resolved determination of refractive power distribution of an optical element, comprising illuminating said optical element with an extended pencil of rays, producing a first number of beam pencils with a first multi hole screen, reducing said first number of beam pencils to a second number of beam pencils, the second number being greater than unity, sensing spatially separated intensity peaks with a spatially resolving detector, wherein the number of said spatially separated intensity peaks is equal to said second number of beam pencils, and calculating said refractive power distribution of the optical element is calculated with a computing unit.

20. The process according to claim 17, wherein said reduction step takes place with a manipulator, which is controllable.

21. The process according to claim 20, wherein said manipulator is a multi hole screen, the multi hole screen being interchanged.

22. The process according to claim 19, further comprising interchanging said optical element.

23. The process according to claim 19, further comprising applying said process to testing different optical elements with known reference refractive power distribution, allocating a stored reference refractive power distribution to said optical element on installation of said optical element, by a signal to said computing unit, wherein said computing unit controls a manipulator for reduction of beam pencils;

measuring a position of said intensity peaks, and determining an actual refractive power distribution with said computing unit.

24. The process according to claim 19, further comprising carrying out a measurement for said optical element with a first control of a manipulator, carrying out at least a further measurement with a second control of said manipulator, said manipulator passing respective other beam pencils through, and determining actual refractive power distribution of said optical element from said measurement and said at least further measurement.

25. The apparatus according to claim 6, wherein said hole spacing is at most $1/50$ of said lateral extent.

* * * * *